(12) United States Patent
Gilbertie

(10) Patent No.: US 7,263,794 B2
(45) Date of Patent: Sep. 4, 2007

(54) MARKING INSTRUMENT WITH SEPARABLE PORTION

(76) Inventor: Sal Gilbertie, 65 Adams Rd., Easton, CT (US) 06612

( * ) Notice: Subject to any disclaimer, the term of this patent is extended or adjusted under 35 U.S.C. 154(b) by 0 days.

(21) Appl. No.: 11/302,893

(22) Filed: Dec. 13, 2005

(65) Prior Publication Data

US 2006/0123702 A1    Jun. 15, 2006

Related U.S. Application Data

(60) Provisional application No. 60/635,843, filed on Dec. 13, 2004.

(51) Int. Cl.
*G09F 23/00* (2006.01)

(52) U.S. Cl. ..................... 40/645; 40/606.19

(58) Field of Classification Search ............... 40/645, 40/668, 606.19, 300
See application file for complete search history.

(56) References Cited

U.S. PATENT DOCUMENTS

| | | | | | |
|---|---|---|---|---|---|
| 3,098,320 | A | * | 7/1963 | Estkowski | 47/56 |
| 4,027,410 | A | * | 6/1977 | Wheeler | 40/645 |
| 4,972,616 | A | * | 11/1990 | Doll | 40/645 |
| 6,327,804 | B1 | * | 12/2001 | Shaw | 40/645 |
| 2005/0172530 | A1 | * | 8/2005 | Huffman | 40/645 |

* cited by examiner

*Primary Examiner*—Gary C. Hoge
(74) *Attorney, Agent, or Firm*—Bachman & LaPointe, P.C.

(57) ABSTRACT

A marker includes a substantially flat member having a separation line dividing the flat member into a first portion having a first end tapering to a first point, and a second portion having a second end tapering to a second point.

16 Claims, 2 Drawing Sheets

MARKING INSTRUMENT WITH SEPARABLE PORTION

CROSS REFERENCE TO RELATED APPLICATION

This application claims the benefit of the filing date of commonly owned Provisional Patent Application Ser. No. 60/635,843, filed Dec. 13, 2004.

BACKGROUND OF THE INVENTION

The invention relates to a marking instrument such as a label or sign, especially for identifying plants and the like.

When selling plants, it is frequently desirable to provide much information regarding the plant at the point of sale. This is viewed as desirable to the consumer and can help in making a favorable impression upon the consumer.

After the sale, the consumer will frequently want to mark the plant with a suitable, simple and preferably subtle marking, which does not necessarily include all the information contained on the marker which was utilized in packaging and making the sale.

The present invention addresses these two conflicting needs.

SUMMARY OF THE INVENTION

In accordance with the invention, a marking apparatus is provided which includes seperably connected portions. The first portion is advantageously a relatively large portion which includes all information relevant to the particular object of the marker. Preferably, this will be in the form of information regarding a particular type of plant or herb. The second portion can be a relatively smaller portion with simply a title for the plant or herb, and optionally some additional decorative markings or care instructions.

The portions are advantageously seperably connected, either along a score line, or perforations or the like, so that a consumer can view the combined portions during purchase and readily see all information relating to the product, and can then easily separate the second portion from the first portion for use in identifying a plant, for example in a garden, with a relatively small unobtrusive marker.

In further accordance with the invention, a marker is provided which comprises a substantially flat member having a separation line dividing the flat member into a first portion having a first end tapering to a first point, and a second portion having a second end tapering to a second point.

In further accordance with the invention, a method for planting is provided, which method comprises the steps of obtaining a plant or plant seed accompanied by a marker containing information regarding the plant; planting the plant in a garden; and positioning a portion of the marker containing a portion of the information adjacent to the plant.

BRIEF DESCRIPTION OF THE DRAWINGS

A detailed description of preferred embodiments of the present invention follows with reference to the attached drawings, wherein.

DETAILED DESCRIPTION

The invention relates to markers including separable portions and, more particular, to markers which are well suited for sale and identification of plants such as herbs and the like.

Figure 1:
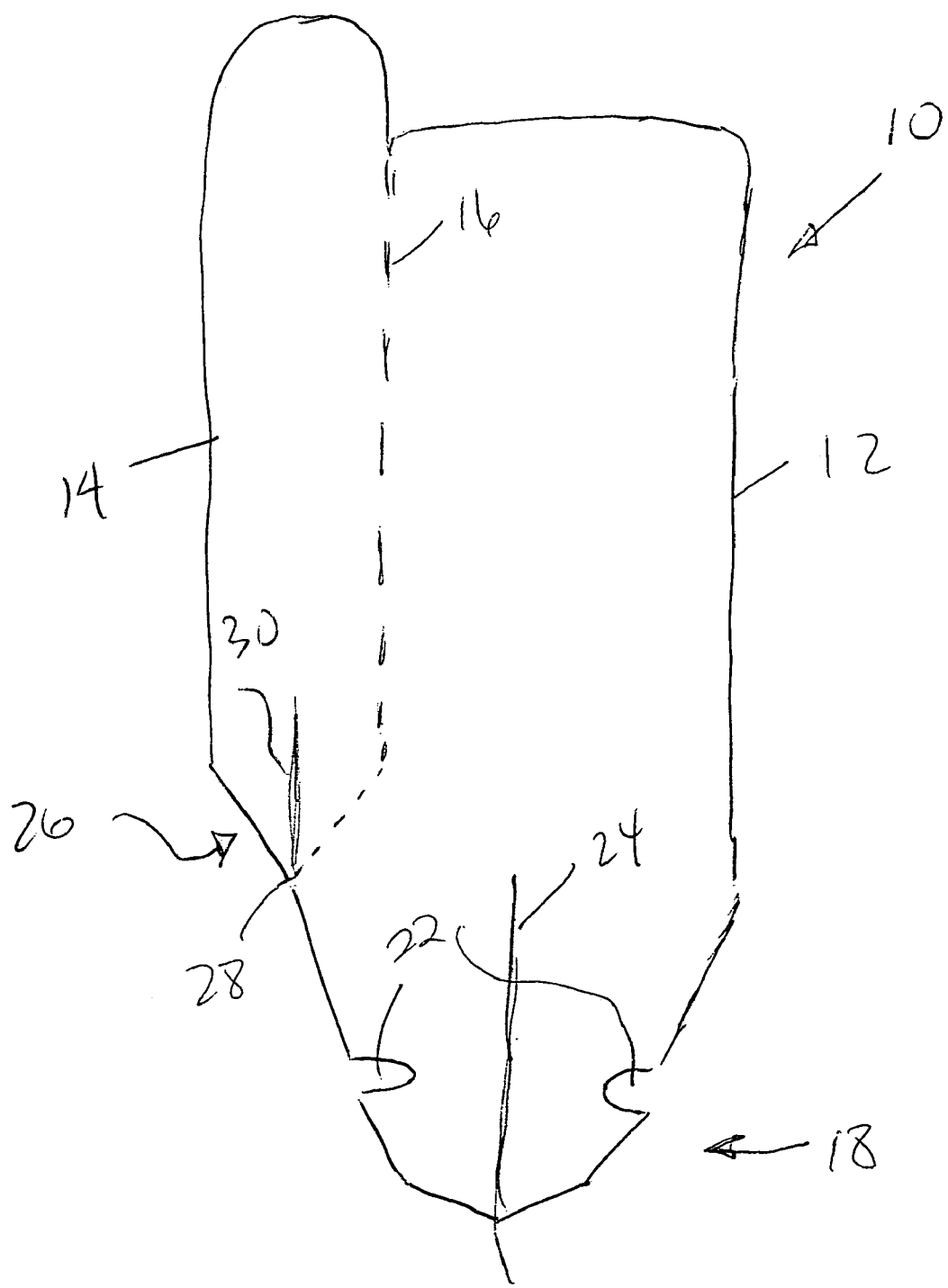
FIG. 1 illustrates a marker in accordance with the present invention.

FIG. 1 shows a marker 10 having a first portion 12 and a second portion 14. Second portion 14 is connected to first portion 12 and advantageously has a separation point 16, in this case a perforation line, which allows for portion 14 to readily be removed from portion 12.

Marker 10 in accordance with the present invention serves two functions. The first function is to provide all potentially desirable information to a consumer making a purchase of the plant or other item in question. Thus, the front and back sides of marker 10 can advantageously be printed or otherwise provide with all potentially desirable information for the consumer.

The second function is to allow the consumer, after the purchase, to readily identify the plant, for example in a garden, with a marker which is less obtrusive than the entire marker 10 would be. Second portion 14 provides this function and, after purchase, it is envisioned that portion 14 can be removed from portion 12 and placed inconspicuously in a garden or the like near the plant in question to provide for ready identification without detracting from the overall appearance of the garden.

In accordance with the invention, portion 14 is therefore preferably relatively smaller than portion 12, and is provided in an aesthetically pleasing configuration.

In accordance with a preferred embodiment of the invention, portion 12 has a lower end 18 which is well suited for positioning in soil, other plant nutrients, or the like, whereby marker 10 can be used to readily identify a particular plant to a potential consumer. Thus, lower end 18 preferably has a pointed tip 20, and can also have cutouts 22 if desired for use in facilitating placement of portion 12 within soil and the like. In addition, lower portion 18 can have a stiffening score line 24 substantially as shown, which serves to axially strengthen lower end 18 during positioning of lower end 18 into soil or the like.

Second portion 14 also advantageously has a substantially pointed lower end 12 so that second portion 14, after separation from first portion 12, can advantageously also be positioned into soil or the like for identifying a plant, for example after it has been planted in a garden.

Lower portion 26 also advantageously has a point 28 which, in this embodiment, is not exposed until after separation of portion 14 from portion 12. Lower end 26 also advantageously has a stiffening score line 30 positioned along the lower end thereof for axially stiffening lower end 26 of second portion 14 to allow for second portion 14 to be positioned into soil without buckling, bending and the like.

In accordance with the embodiment illustrated in FIG. 1, it should be appreciated that point 28 of second portion 14 is defined in part by an outer edge of the combined marker 10, and is further defined in part by a portion of the separation line between first portion 12 and second portion 14.

Since each of second portion 14 and first portion 12 are desirable to be in the form of substantially elongate members, it is preferred that these members be aligned so that their longitudinal axes are substantially parallel, and further such that score line 24 is substantially parallel to longitudinal axes of first and second portions 12, 14.

In the embodiment shown, the substantial portion of score line 24 is parallel to the longitudinal axis, with the lower most portion of score line 24 being angled to help define point 28 as described above.

In accordance with a preferred aspect of the present invention, second portion 14 can advantageously be provided with indicia which are simple and can advantageously be used for identifying the plant. Thus, second portion 14 can be provided with the name of the plant or herb in question, and in other respects be provided as merely decorative. In accordance with a preferred embodiment of the present invention, second portion 14 can also contain care instructions or the like for the plant, which can advantageously serve as a reminder to the caregiver of the plant for use in maintaining the plant in a healthy condition.

In connection with the information set forth on the first and second portions 12, 14, this information preferably includes the name of the plant in the portions of information which are on each of first and second portions 12, 14, so that the plant is readily identified both before and after separation of these portions. Further, second portion 14 is preferably designed in a natural or esthetically pleasing manner such that the second portion, when positioned in the garden, does not detract from the natural appearance of the garden. In this regard, a natural print on the second portion could include a wide variety of natural appearances such as a wood grain appearance, a leafy appearance, the appearance of soil and the like. In one preferred embodiment of the present, second portion 14 is provided with a wood grain design which advantageously serves to present a natural appearance in use of the product.

FIG. 1 shows first portion 12 and second portion 14 connected along a perforated separation line 16. This can be perforated as shown in FIG. 1, or can be scored, or can be provided in any other manner which allows for easy separation of second portion 14 from first portion 12. In a most basic form, line 16 could even be a marking line for use in cutting with scissors. In a preferred embodiment, however, line 16 does include some form of scoring and/or perforation for use in allowing second portion 14 to be easily removed, for example, by hand.

Marker 10 can be manufactured from any suitable material, and preferably of a material which is resistant to the elements and therefore is suitable for placement outdoors. Thus, marker 10 can be provided from sheet plastic, metal, wood, or any other material which would be readily apparent to a person of ordinary skill in the art.

Figure 2:
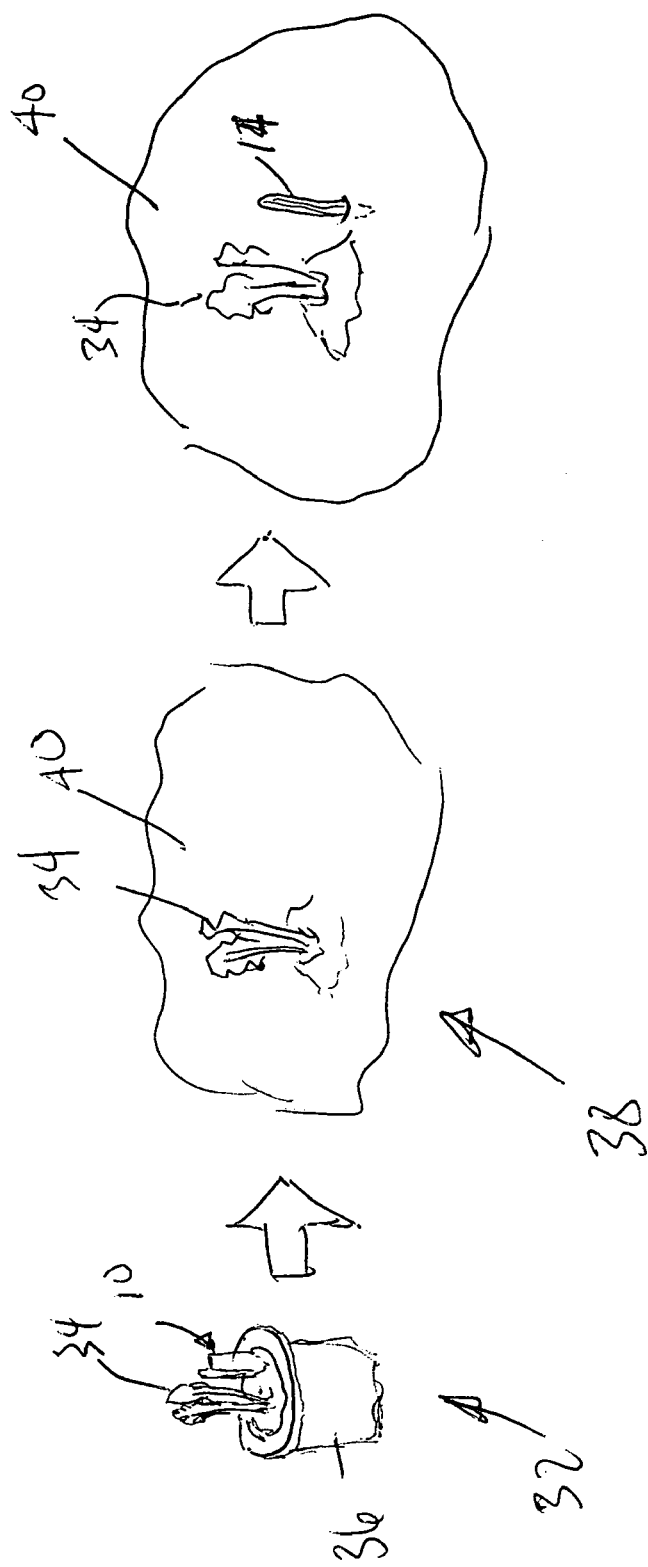
FIG. 2 illustrates a method for planting in accordance with the present invention.

FIG. 2 shows in a first step 32 plant 34 in a pot 36 accompanied by a marker 10 in accordance with the present invention. A user or purchaser of the plant can then transfer plant 34 to a garden 40 as shown in step 38. Second portion 14 of marker 10 can then be separated and placed into garden 40, preferably substantially adjacent to plant 34, so as to provide identification and care information regarding plant 34 without detracting from the natural appearance of the garden.

It should readily be appreciated that in accordance with the present invention, marker 10 allows for a substantially large surface area to be utilized for presenting information to a potential purchaser of the plant, nevertheless, allowing for easy removal of a smaller more esthetically pleasing portion of the marker for use in identification of the plant after transfer to a garden or the like. It should be appreciated that FIG. 2 is a schematic illustration of one method for carrying out the present invention, and that marker 10 in accordance with the present invention can be utilized in other manners within the broad scope of the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as described above.

What is claimed is:

1. A marker, comprising:
   a substantially flat member having a separation line dividing the flat member into a first portion having a first end tapering to a first point, and a second portion having a second end tapering to a second point, wherein the flat member has an outer edge, and wherein the second point is defined by the outer edge and the separation line in combination.

2. The marker of claim 1, wherein the separation line comprises a second line.

3. The marker of claim 1, wherein the separation line comprises a line of perforations.

4. The marker of claim 1, further comprising a score line running along a length of the first point.

5. The marker of claim 1, further comprising a score line running along a length of the second point.

6. The marker of claim 1, wherein the marker is marked with information, and wherein a first component of the information is on the first portion and a second component of the information is on the second portion.

7. The marker of claim 6, wherein the marker is combined with at least one of a plant and a seed, and wherein the name of the plant is contained in both of the first and second components of information.

8. The marker of claim 1, wherein each of the first and second portions has a longitudinal axis passing through the first and second points respectively, and wherein a substantial portion of the separation line is parallel to the longitudinal axis of the first and second portions.

9. The marker of claim 1, wherein the first point is defined by side edges, and further comprising end cutouts along the side edges.

10. The marker of claim 1, wherein the first portion contains information which is not on the second portion, and wherein the second portion is printed with a natural print.

11. The marker of claim 10, wherein the natural print is a wood grain print.

12. A marker, comprising:
    a substantially flat member having a separation line dividing the flat member into a first portion having a first end tapering to a first point, and a second portion having a second end tapering to a second point, wherein the first portion is larger than the second portion.

13. The marker of claim 12, wherein the flat member has an outer edge, and wherein the second point is defined by the outer edge and the separation line in combination.

14. A method for planting, comprising:
    obtaining a plant or plant seed accompanied by a marker containing information regarding the plant;
    planting the plant in a garden; and
    positioning a portion of the marker containing a portion of the information adjacent to the plant, wherein the marker comprises a substantially flat member having a separation line dividing the flat member into a first portion having a first end tapering to a first point, and a second portion having a second end tapering to a second point, wherein the flat member has an outer edge, and wherein the second point is defined by the outer edge and the separation line in combination, and further comprising the step of separating the second portion from the first portion and positioning the second portion adjacent to the plant.

15. The method of claim 14, wherein the first portion is larger than the second portion.

16. The method of claim 14, wherein the plant has a name, and the name is included on both the first portion and the second portion.

* * * * *